(12) United States Patent
Yoshimura

(10) Patent No.: US 7,958,636 B2
(45) Date of Patent: Jun. 14, 2011

(54) METHOD OF MANUFACTURING LIGHT-ALLOY WHEEL FOR VEHICLE AND THE WHEEL

(75) Inventor: Katsunori Yoshimura, Fukui (JP)

(73) Assignee: Washi Kosan Co., Ltd., Tokyo (JP)

( * ) Notice: Subject to any disclaimer, the term of this patent is extended or adjusted under 35 U.S.C. 154(b) by 1308 days.

(21) Appl. No.: 10/586,763

(22) PCT Filed: Jan. 19, 2005

(86) PCT No.: PCT/JP2005/000593
§ 371 (c)(1),
(2), (4) Date: Aug. 9, 2006

(87) PCT Pub. No.: WO2005/068221
PCT Pub. Date: Jul. 28, 2005

(65) Prior Publication Data
US 2007/0084055 A1      Apr. 19, 2007

(30) Foreign Application Priority Data

Jan. 20, 2004 (JP) .................... 2004-012447
Jan. 23, 2004 (JP) .................... 2004-016406
Oct. 18, 2004 (JP) .................... 2004-303588

(51) Int. Cl.
*B21D 53/26* (2006.01)
*B23P 17/00* (2006.01)
*B60B 21/00* (2006.01)

(52) U.S. Cl. ........... 29/894.32; 29/894.324; 29/894.325; 29/505; 301/95.104; 301/95.105

(58) Field of Classification Search .............. 29/894, 29/894.32, 894.324, 894.35, 505, 515, 521; 301/95.104, 95.105
See application file for complete search history.

(56) References Cited

U.S. PATENT DOCUMENTS

| 5,282,673 | A | | 2/1994 | Koyama et al. |
| 5,794,340 | A | * | 8/1998 | Pollkotter ............... 29/894.324 |
| 6,783,190 | B1 | * | 8/2004 | Baumgartner ............ 301/64.102 |

FOREIGN PATENT DOCUMENTS

| EP | 1112867 | 7/2001 |
| JP | 63-290640 | 11/1988 |
| JP | 63-290643 | 11/1988 |
| JP | 1-249501 | 10/1989 |
| JP | 5-16602 | 1/1993 |
| JP | 5-278401 | 10/1993 |
| JP | 10-6705 | 1/1998 |
| JP | 2000-142007 | 5/2000 |
| JP | 2003-527269 | 9/2003 |

* cited by examiner

Primary Examiner — David P Bryant
Assistant Examiner — Alexander P Taousakis
(74) Attorney, Agent, or Firm — Jordan and Hamburg LLP

(57) ABSTRACT

An outer rim molded material is molded by forging or casting, a portion of the outer rim which extends from a hump to a bead seat is separated from part of a rim flange precursor 2a and is caused to fall in a sloping fashion inwards of a wheel width so as to form a bead seat precursor 12a, and the bead seat precursor 12a so formed is then joined to be welded to a top or side of a rim well rising portion precursor 5b. An external surface is cut to be finished to a proper shape, and an annular hollow portion 8 is formed underneath a lower surface of the bead seat portion.

4 Claims, 7 Drawing Sheets

(a)

(b)

(c)

(d)

(a)

(b)

(c)

(a)

(b)

(c)

US 7,958,636 B2

METHOD OF MANUFACTURING LIGHT-ALLOY WHEEL FOR VEHICLE AND THE WHEEL

TECHNICAL FIELD

The present invention relates to a method for manufacturing a light alloy automotive wheel having an annular hollow portion provided in an outer rim portion thereof, and a wheel manufactured by the method.

BACKGROUND ART

As light alloy automotive wheels which are made of materials such as aluminum and magnesium are light in weight and good in machinability, wheels having superior designs have been provided, and the mounting ratio of such light alloy automotive wheels is so increased that they are mounted on production lines. However, external shapes of outer rims, such as shapes of a bead seat, a hump, a slope from the hump to a rim well and an inner surface of a rim flange, on which a tire is mounted, are regulated by the international standard made by European Tire and Rim Technical Organization (ETRTO), and in order to secure a regulated rigidity at these portions of a rim, the rim is constructed to have a certain thickness. Although the thickness of the rim only has to be increased in order to increase the rigidity of the rim, increasing the thickness results in an increase in weight of the rim and an increase in unsprung weight, leading to a risk that the steering performance is lost remarkably. To solve the problem, there have been proposed a technique in which a hollow portion is provided in a rim portion to suppress the increase in weight while increasing the rigidity. As the related arts, there are raised JP-A-5-278401 and JP-2003-527269T (Japanese translation Publication of WO01/017799). The crux of these techniques is to establish a communication between hollow portions in a spoke portion and a rim portion. In the former technique, due to a limitation imposed by a casting method, an outer rim portion and an inner rim portion are cast separately, and thereafter, they are integrated with each other by a friction welding method to complete a wheel. In the latter technique, part of an annular hollow portion is defined by welding a separate segment, or by molding an annular flange simultaneously when the rim is formed and then causing the flange to fall in a sloping fashion so as to define a hollow portion. Although it is a superior method that the annular flange is molded integrally with the rim so as to erect in a diametrical direction of a wheel when the rim is molded, a quite large number of preparation steps are necessary to cause the annular flange so integrally molded to fall in a curved fashion into a substantially L-shape. The increase in the number of steps constitutes a causes for an increase in production costs, and therefore, a further simple and easy method is desired. The invention was made in view of these situations.

DISCLOSURE OF THE INVENTION

Problems to be Solved by the Invention

A problem that the invention is to solve is to provide a method which can facilitate the manufacture of a light alloy automotive wheel by reducing the number of preparation steps for forming a hollow portion in a rim portion of the wheel.

Means for Solving the Problems

A first aspect of the invention is for a method for manufacturing a light alloy automotive wheel having an outer rim portion, an inner rim portion and a center disc portion, characterized in that a portion of an outer rim which extends from a hump to a bead seat is separated from part of a rim flange and is caused to fall inwards of a wheel width in a sloping fashion by spinning to make a bead seat precursor so as to be joined to a top or side of a rim well rising portion, so that an annular hollow portion is formed underneath a lower surface of a bead seat portion. The rim well rising portion is molded in advance as an annular flange when a wheel is molded and then formed to erect in a predetermined shape by cutting or spinning, so as to intersect with the portion which is separated from part of the rim flange and is caused to fall in the sloping fashion. Consequently, since the rim well rising portion and the bead seat precursor are not originally connected to each other, no machining is necessary to bend the flange portion so as to fall in the L-shape, and therefore, the machining accuracy is increased while the complicated and troublesome machining is eliminated.

Claim 2 is directed to a light alloy automotive wheel manufacturing method characterized in that an excess thickness is provided on both or either of an outside diameter and an outside of the rim flange, a portion corresponding to the excess thickness is separated from the rim flange, and the portion extending from the hump to the bead seat is molded. The excess thickness portion configures a cross sectional shape which includes a rim flange precursor and the bead seat precursor. The separated excess thickness portion is the bead seat precursor and is caused to fall in the sloping fashion by spinning, while the remaining portion makes up the rim flange precursor.

Claim 3 is directed to a light alloy automotive wheel manufacturing method characterized in that the portion extending from the hump to the bead seat and the rising portion of the rim well are joined together by welding. The portion where the rim well rising portion precursor and the bead seat precursor which is caused to fall in the sloping fashion intersect with each other is welded and then cut in a predetermined shape to be completed so that the rim well rising portion and the bead seat portion form an annular hollow portion.

Claim 4 is directed to a light alloy automotive wheel manufacturing method characterized in that a hollow portion is formed in a spoke of the center disc portion, so as to form a hollow portion in which the hollow portion in the spoke and the annular hollow portion are made to communicate with each other. The hollow portion in the spoke is molded when a wheel is molded, or formed by machining by a drill or the like after the spoke is molded in solid. The spoke hollow portion is constructed so as to be open to the rim side, and intersects with the annular hollow portion to establish a communication therebetween, whereby a light wheel is provided.

A light alloy automotive wheel that is manufactured by the manufacturing method described heretofore is lighter in weight by at least 20% than a wheel having no hollow portion provided therein, whereby a light alloy automotive wheel is provided which has a high rigidity by virtue of a monocoque construction.

A second aspect of the invention is for a method for manufacturing an integrated light alloy automotive wheel including a center disc portion and outer and inner rims characterized in that a patch is provided annularly on a bead seat portion of both or either of the outer rim and the inner rim, so as to form an annular hollow portion radially inwards of the bead seat portion. The bead seat portion and the slope portion which extends from the hump to the rim well are not configured as an integrated part, and the annular patch is fabricated separately in such a manner as to be expanded by forming cuts therein partially or to be divided into at least two halves and is then mounted on the bead seat portion, while the slope portion is molded integrally with a rim main body in such a manner as to support one end of the patch.

Claim 7 is directed to a light alloy automotive wheel manufacturing method as set forth in the sixth aspect of the invention characterized in that the patch is made of a light alloy similar to that of a wheel main body, a surface of the rim on which the patch is mounted is machined to make a seat so as to determine a mounting position, at least part of the annular patch is cut so as to be mounted on the mounting position while being expanded, and mounting surfaces of the patch and the wheel main body are joined together by welding. After the joining, the joined portion is machined into a predetermined shape so as to complete the bead seat portion.

Claim 8 is directed to a light alloy automotive wheel manufacturing method characterized in that the patch is molded using a prepreg of an inorganic fiber or high tensile strength resin fiber or is formed of a composite material of a light metal batten and the fibers as described above and then joined to the wheel main body. Glass fibers or carbon fibers are used as the inorganic fiber, and Kevlar fiber is used as the high tensile strength resin fiber. A prepreg made by binding any of the fibers with a resin is molded into the shape of the bead seat, and then wound around to be bonded to the rim main body as the patch. Alternatively, the prepreg is affixed to a light metal batten to form a composite material and is then fixedly bonded to the rim main body as the patch. Alternatively, a thin light metal batten is fixedly bonded to the rim main body in advance, and any of the fibers is wound around the upper side of the batten to be fixed thereto with a resin.

Claim 9 is directed to a light alloy automotive wheel manufacturing method characterized in that a spoke is formed hollow, so as to form a hollow portion by causing the hollow portion in the spoke and the annular hollow portion to communicate with each other. In the case of casting a wheel, a disc and a rim each having a hollow portion molded therein by using cores are used when the wheel is molded, and in the case of forging a wheel, a hollow portion is formed in a spoke portion using a drill, the patch is used to form a hollow portion on the inner side of the bead seat portion, and the hollow portions so formed are made to communicate with each other.

Claim 10 is directed to an integrated light alloy automotive wheel that is manufactured by the manufacturing method described heretofore.

A light metal automotive wheel obtained by the manufacturing method described heretofore is lighter in weight by at least 20% than a wheel having no hollow portion therein, whereby a light alloy automotive wheel is provided which has a high rigidity by virtue of a monocoque construction.

ADVANTAGES OF THE INVENTION

According to the first aspect of the invention, when forming the hollow portion in the spoke portion and/or the rim portion of the wheel, the ingress and egress of casting cores or a drill is facilitated, since the bead seat portion is constructed so as to be integrated with the rim flange along one edge portion while being joined to the rim well rising portion only along the other edge portion thereof, a strong connecting portion is configured on the rim flange without imparting any effect on the metallic compositions by welding, and since there is only one welding location, thermal strain is reduced. In addition, since the rim well rising portion and the bead seat portion are formed individually, there are provided advantages that cutting is facilitated and that the rim flange does not have to be bent to fall in the L shape in section to thereby increase the machining accuracy. Cutting and spinning processes can be simplified so as to reduce the production costs.

According to the second aspect of the invention, since the bead seat is formed by joining the annular patch thereto in a post-process to facilitate the ingress and egress of a casting core or a drill which is used to form a hollow portion in the spoke portion and/or the rim portion of the wheel, a number of steps of cutting and spinning can be omitted, thereby making it possible not only to increase the machining accuracy but also to reduce the production costs.

BEST MODE FOR CARRYING OUT THE INVENTION

Best modes for carrying out the invention of the subject patent application will be described below based on the accompanying drawings.

Embodiment 1

FIG. 1(b) is a sectional view of a completed outer rim portion 1, wherein reference numeral 2 denotes an outer rim flange, 3 a bead seat, 4 a hump, 5 a rim well rising portion, 6 a rim well, 7 a rim outer shell portion, and 8 an annular hollow portion. Reference numeral 9 denotes a spoke, which makes up a disc portion. Reference numeral 10 denotes a spoke hollow portion, which is formed using a core in the case of casting, or by machining the sport firstly formed solid using a drill or the like.

FIG. 1(a) is a sectional view showing a cast outer rim material 1a, and a spoke hollow portion 10 is formed by drilling. A broken line shows a hollow portion that is to be formed using a core during casting. Compared to an outer rim flange 2, an excess thickness is formed on a flange precursor 2a for forming the outer rim flange 2. In addition, an annular flange molded body 5a for forming a rim well rising portion 5 has a trapezoidal cross section and makes up a rim well rising portion precursor 5b as well as part of an annular hollow portion 8 by cutting a hatched portion 6 along the full circumference thereof. Reference numeral 6a denotes a rim well molded material and is extended by spinning or cut to form a rim well. Reference numeral 11 denotes a spinning roller, and how the roller is operated will be described later on. FIG. 1(c) shows another example of a flange precursor 2b. In this additional example of the flange precursor 2b, an elevation is provided in the excess thickness, so that the spinning roller 11 is allowed to be easily pressed against an inside corner 2c for separation of a bead seat precursor 12.

FIG. 2(a) shows a state in which the flange precursor 2a and a spoke portion 9 are fixed to a die 13 of a spinning machine and the spinning roller 11 is brought into press contact with the flange precursor 2a so as to tear the precursor 2a open to thereby allow a bead seat precursor 12 to be separated therefrom. In FIG. 2(b), a spinning roller 14 having a different shape is brought into press contact against a portion where the bead seat precursor 12 is separated and is then operated in a direction indicated by an arrow A so as to cause the bead seat precursor 12 to fall further in a sloping fashion at the separated portion to thereby form a bead seat precursor 12a. The bead seat precursor 12a so formed is then superposed on the top of a rim well rising portion 5b so as to be joined to the rim well rising portion 5b by welding. As this occurs, the top of the rim well rising portion 5b needs to be cut to form a smooth surface in advance. FIG. 2(c) shows an example in which an elevation is provided at a top portion of a rim well rising portion 5c and a tapered surface is machined at a distal end portion of a bead seat 12b so that a welding gap is changed. FIG. 2(d) shows an example in which the welding gap is not provided.

Embodiment 2

FIG. 3 shows how to manufacture the outer rim 1 using a forging method. FIG. 3(a) is a vertical sectional view showing a state in which when forging a spoke portion 9, an outer rim precursor 15 is forged integrally with the spoke portion 9, an outer rim portion which will be completed being shown by chain lines. FIG. 3(b) shows a state in which spinning is applied to the outer rim precursor 15, so as to form a flange precursor 2b, a rim well precursor 6b and a rim well rising precursor 5c. Furthermore, drilling for making a hole is applied to the spoke portion 9 to form a spoke hollow portion 10, and a hatched portion 6a is cut to be removed along the full circumference thereof so as to form an internal surface of the rim well rising portion precursor 5c. FIG. 3(c) shows a state in which a groove 16 is cut in the flange precursor 2b, and the spinning roller 11 is then pressed against the groove 16 so formed, so as to form the bead seat precursor 12a in the manner that has been described before.

Embodiment 3

In preparing an outer rim portion 1 having an annular hollow portion provided therein, another mode for carrying out the invention will be described with respect to the arrangement of a predetermined amount of material and shape thereof for forming an outer and inner rims on a circumferential edge of a disc portion such as a spoke to which a certain design is imparted. FIG. 4(a) shows a cross section of a rim precursor 15a which is forged or cast, and hatching is imparted thereto. In the case of the rim precursor 15a being forged, drilling is applied to a spoke 9a which makes up a disc portion so as to form a spoke hollow portion 10a. In the case of the rim precursor 15a being cast, a core may be used to form the spoke hollow portion 10a. The spinning roller 11 is brought into press contact with the rim precursor 15a so as to tear it open, and part of the rim precursor is caused to fall in a sloping fashion to a position indicated by a chain double-dashed line. Furthermore, as shown in FIG. 4(b), a spinning roller 14 having a different shape is used to form a rim well precursor 6b and a novel flange 17.

Following this, portions indicated as hatched portions 18 and 19 are cut to be removed along the full circumference thereof so as to form an outer rim flange 2 and a flange 17a for forming a bead seat and a rim well rising portion. The flange 17a is bent while being spun by the spinning roller 14, so that a distal end portion of the flange 17a is pressed against an elevation 20 which is provided when the rim precursor 15a is machined by cutting to form the outer rim flange 2, and the spinning step is completed. Next, the elevation 20 and a distal end of the flange 17a are welded together, and thereafter, a heat treatment is applied to the wheel material as required for cutting. As shown in FIG. 4(c), a bead seat 3 and a rim well rising portion 5 are formed, and an annular hollow portion 8 is formed, as well. During the spinning step, the rim well precursor 6b is also extended by means of spinning, so as to form a rim well 6.

Embodiment 4

Various shapes are adopted for a rim precursor for forming an outer rim and an inner rim, provided that the precursor can be removed from a mold without any difficulty. FIG. 5(a) shows a further mode for carrying out the invention. FIG. 5(a) is a sectional view showing a state in which a rim precursor 15b is forged or cast integrally with a spoke of a disc portion with a hollow portion 10 so formed integrally or formed by drilling in such a manner as to communicate with a spoke portion 9b. A broken line shows an outer rim portion 1 which will result when completed. The spinning roller 11 is forced into the rim precursor at a position shown in the figure so as to tear it open, and as shown in FIG. 5(b), part of the rim precursor is caused to incline to a position shown by a chain double-dashed line. Following this, spinning is applied by a spinning roller having a different shape, so as to form a novel flange 18 and a rim well precursor. Thereafter, similar steps to those of Embodiment 3 are followed to complete an outer rim having an annular hollow portion.

Embodiment 5

Although not shown particularly, the method for providing the annular hollow portion underneath a lower surface of the bead seat as described above can be applied to the inner rim flange side. During casting, an annular flange is molded in such a manner as to erect from a rim well so as to form a rim well rising portion, and a bead seat precursor is separated from an inner rim flange precursor. The bead seat precursor so separated is then caused to fall in a sloping fashion so as to be joined by welding to the rim well rising portion to thereby form an annular hollow portion.

Embodiment 6

FIG. 6(a) is a partial vertical section of a light alloy automotive wheel 21 of the invention, wherein reference numeral 22 denotes a spoke, and 23 an outer rim portion. A hatched portion indicates the shape of a completed article. Reference numeral 24 denotes an outer rim flange, 25 a bead seat portion, 26 a slope portion, 27 a hump portion, and 28 a rim well portion. A portion indicated by a chain double-dashed line indicates the shape of a material 34 after casting is completed, and reference numeral 29 indicated by a broken line indicates an external configuration of an outer rim. Reference numeral 30' denotes an annular flange precursor, which is contained in a material after casting, and the annular flange precursor is then caused to fall in a sloping fashion by spinning and is cut to produce an annular flange 30. Reference numeral 31 denotes a hollow portion that is defined after a core is removed and is made to open outwards before a bead seat portion is joined thereto. Reference numeral 32 denotes an annular groove which is molded along the full circumference of the rim by a mold used when casting, and when a patch 25' is joined and welded thereto, an annular hollow portion is formed. The patch is produced by bending annularly a light alloy batten in a separate step, and since it is partially provided with a cut surface, the patch can be mounted over the annular groove beyond an outside diameter of the outer rim flange 24 while being expanded. The provision of the cut surface is not limited to a single location, but may be provided in a plurality of locations, and portions of the patch which are so divided may be joined and welded together thereafter. Reference numerals 33a and 33b denote a weld where the patch 25' is joined by means of laser welding. Although cutting is carried out in order to correct strain after weld joining, a hump portion 27 is formed then. In place of the patch, an inorganic fiber such as glass fiber or carbon fiber or a high tensile strength rein fiber such as Kevlar fiber can be molded using a resin so as to have a cross section which matches the shape of the bead seat portion. As this occurs, a prepreg is used in which any of the aforesaid fibers is arranged in parallel in advance and is then formed into a batten shape using an adhesive such as epoxy resin, or a thin batten made of a light alloy is affixed on a seat 33, which will be described later, the aforesaid fiber is wound therearound and then fixed in place with the adhesive, so as to form a composite material for formation of a bead seat portion.

FIG. 6(*b*) shows mainly the portion of the annular flange precursor 30'. The annular flange precursor 30' is molded in such a manner as to erect substantially at right angles from a material 34 which makes up a rim well portion when the material is molded, so that the removal of a core or a mold is facilitated. A portion indicated by an arrow P is radiused so that the annular flange precursor 30' easily falls in a sloping fashion when spinning is applied thereto, and after it has been made to fall in a sloping fashion, a seat 33 is cut therein so that a patch is mounted thereon. Similarly, a seat 33 is cut on the outer rim flange side.

Embodiment 7

FIG. 7(*a*) shows a spoke 22*a* which is shaped such that a disc of a wheel curves and protrudes outwards. Consequently, a hollow portion 31*a* is formed in an inclined direction relative to an axial direction. In addition, an annular flange precursor 35' is molded to have a trapezoidal cross section, and a portion indicated as a hatched portion 36 is cut to be removed along the full circumference thereof so as to form an annular flange 35. Then, an annular patch 25' is joined and welded to the annular flange 35 so formed so as to form an annular hollow portion 32*a*. After welding, a cast material 34*a* is cut to form a slope portion 26, whereby a completed article is obtained which is indicated by hatched areas. A broken line 37 indicates a boring line which defines the area of boring carried out using a drill, which is a method to be adopted in place of using a core during casting.

FIGS. 7(*b*) and 7(*c*) show examples different in shape of weld joining portions 33*b* where bead seat portions 25*a* and 25*b* are welded to slope portions 26*a*, 26*b*, respectively, and an annular hollow portion 32 is formed by either of the methods.

INDUSTRIAL APPLICABILITY

According to the first aspect of the invention, since the bead seat portion and the rim well rising portion are fabricated individually when the hollow portion is formed in the rim portion and/or the spoke portion, the invention can be applied easily without being affected by the shape of a disc of a wheel having a hollow portion provided in a spoke portion thereof.

According to the second aspect of the invention, since the bead seat portion and the slope portion are fabricated individually when the hollow portion is formed in the rim portion and/or the spoke portion, the invention can be applied simply without being affected by the shape of a wheel having a hollow portion which is light in weight and highly rigid.

REFERENCE NUMERALS

Figure 1:
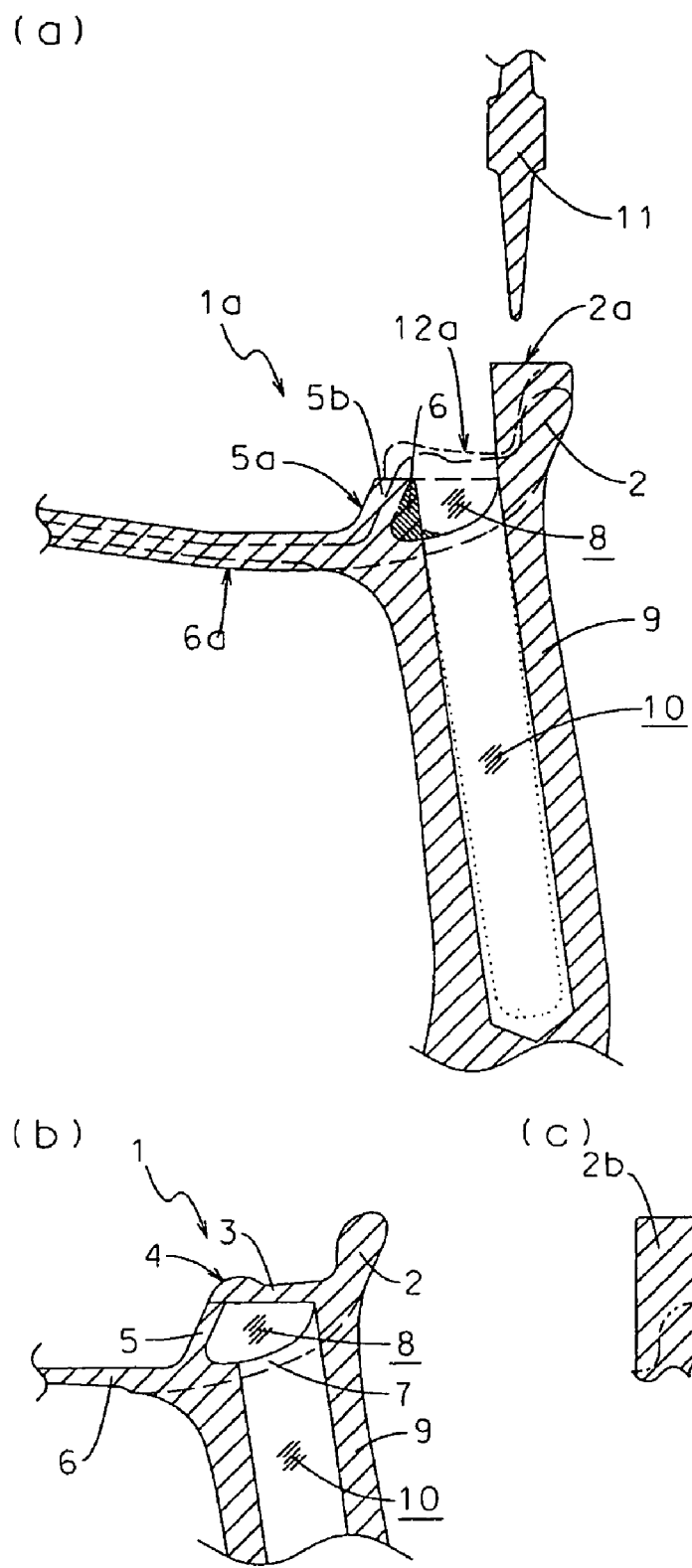
FIG. 1(*a*) is a sectional view showing the shape of an outer rim molded material that is molded by a casting method, FIG. 1(*b*) is a sectional view of a completed outer rim portion, and FIG. 1(*c*) is a sectional view showing the shape of another molded material for an outer rim flange portion, which are for Embodiment 1.
Figure 2:
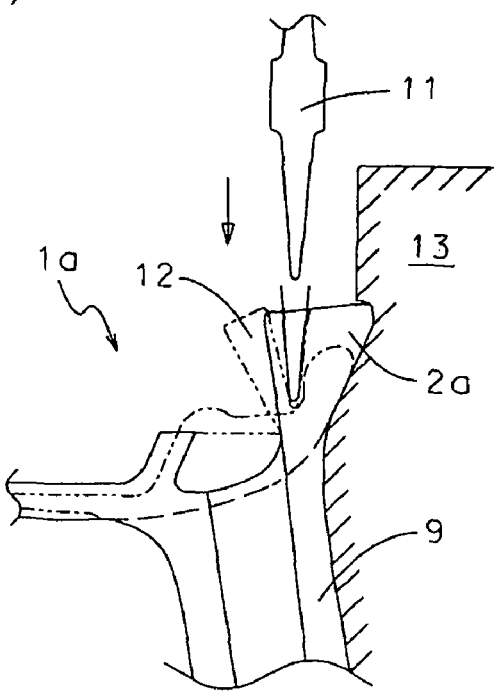
FIGS. 2(*a*) and 2(*b*) are explanatory diagrams showing how to form a bead seat, Fig. (c) is a sectional view showing a joining configuration between a rim well rising portion and the bead seat, and Fig. (d) is a sectional view showing another joining configuration between the rim well rising portion and the bead seat, which are for Embodiment 2.
Figure 2:
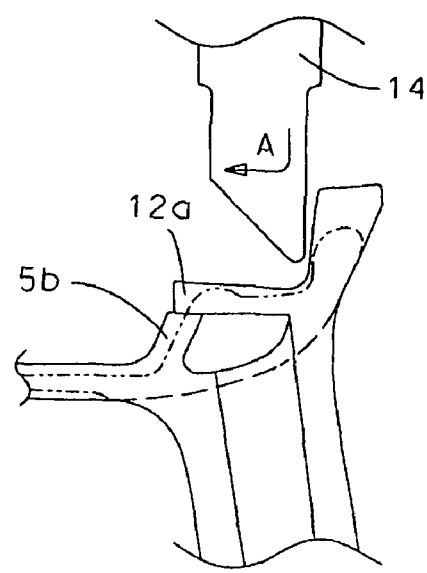
Figure 2:
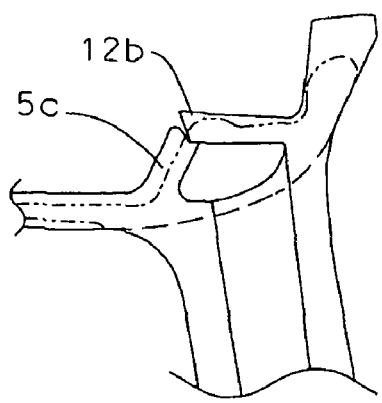
Figure 2:
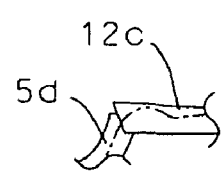
Figure 3:
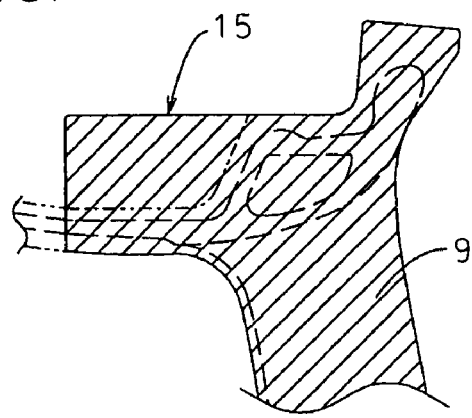
FIG. 3(*a*) is a sectional view showing the shape of a molded material for an outer rim portion that is formed by a forging method, FIG. 3(*b*) is a partially sectional view showing a state after spinning has been applied, and FIG. 3(*c*) is an explanatory diagram showing how to form a rim well rising portion and a bead seat precursor, which are for Embodiment 2.
Figure 3:
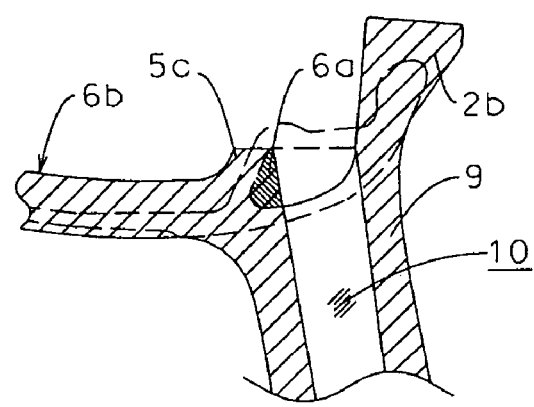
Figure 3:
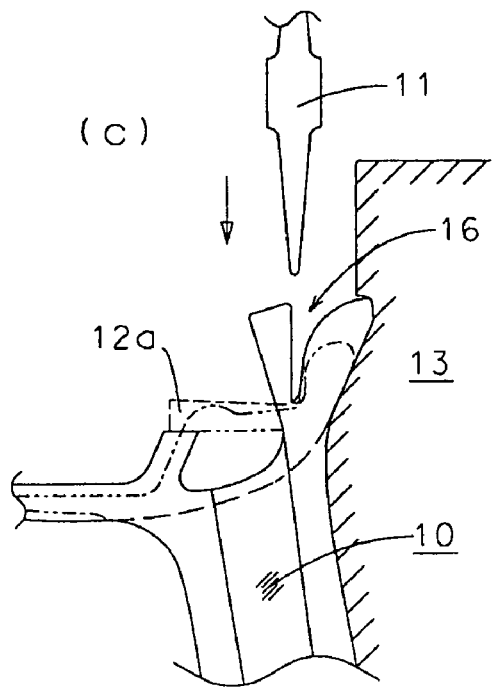
Figure 4:
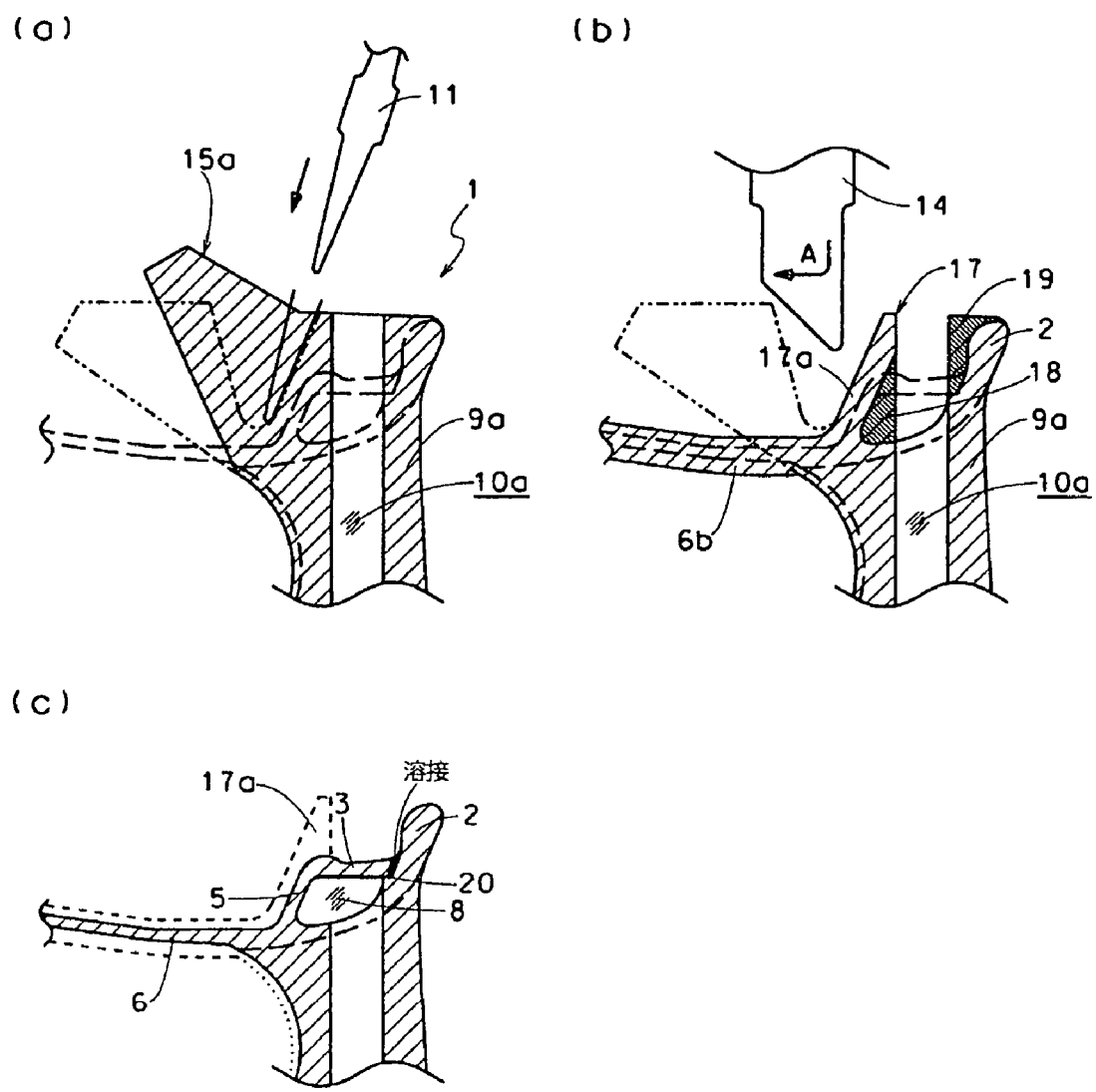
FIG. 4(*a*) is a sectional view showing the shape of another molded material of an outer rim that is forged or cast, FIG. 4(*b*) is an explanatory diagram showing a shape of the another molded material after it has been torn open, and FIG. 4(*c*) is a sectional view showing a completed outer rim portion, which are for Embodiment 3.
Figure 5:
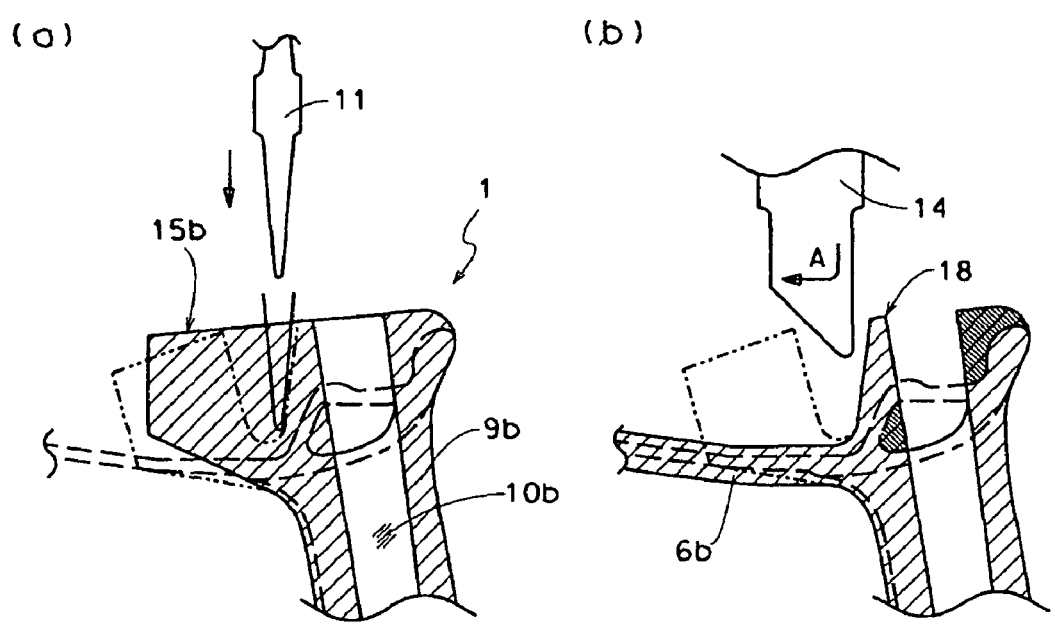
FIG. 5(*a*) is a sectional view showing the shape of a further molded material of an outer rim that is forged or cast, and FIG. 5(*b*) is an explanatory diagram showing a shape of the further molded material which results after it has been torn open, Embodiment 4.
Figure 6:
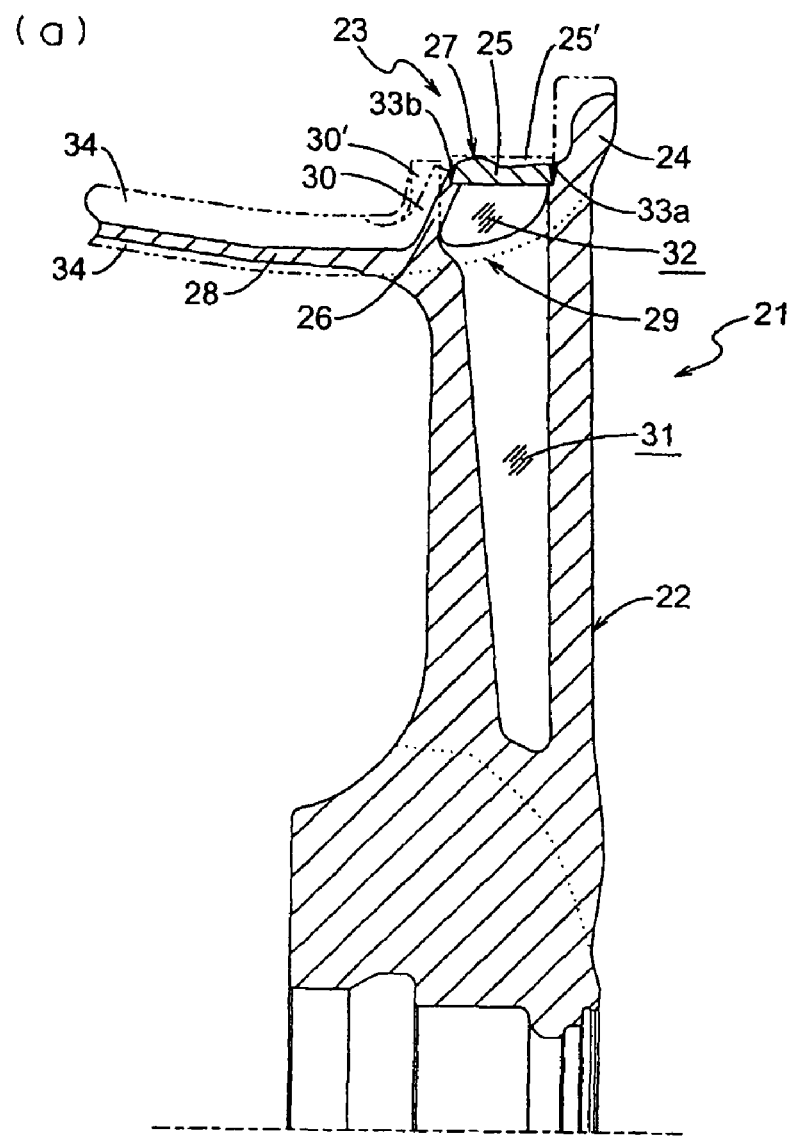
FIG. 6(*a*) is a vertical sectional view showing a spoke portion and a rim portion which illustrates an embodiment of the invention, and FIG. 6(*b*) is a partially sectional view showing how to form a slope portion, which are for Embodiment 6.
Figure 6:
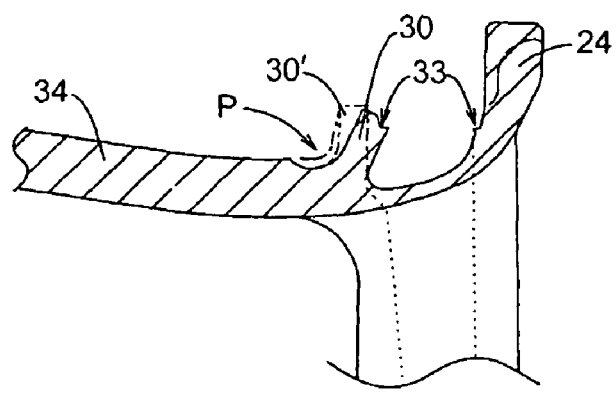
Figure 7:
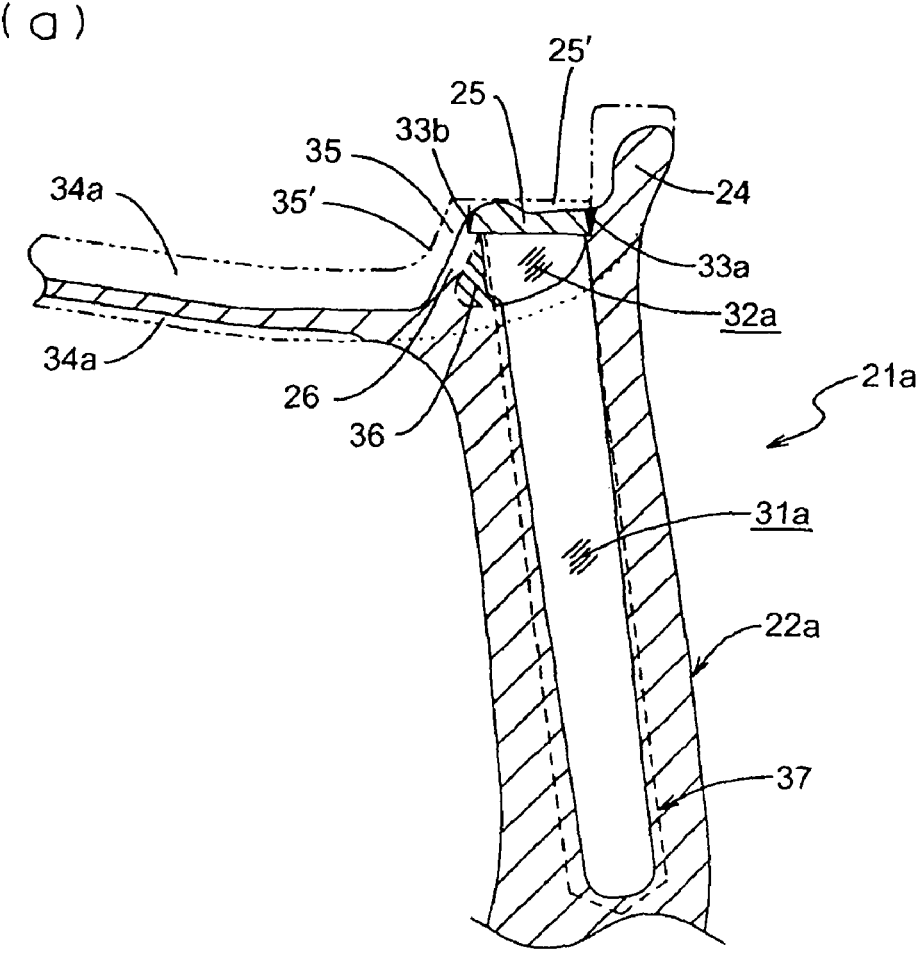
FIG. 7(*a*) is a vertical sectional view showing another embodiment, and FIGS. 7(*b*) and 7(*c*) are partially sectional views showing two examples of how to execute joining at a bead seat portion, which are for Embodiment 7.
Figure 7:
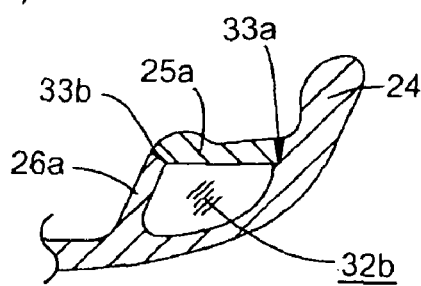
Figure 7:
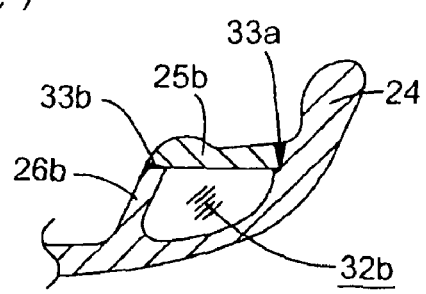

1: outer rim portion; 2: outer rim flange; 2*a*: rim flange precursor; 3: bead seat; 4: hump; 5: outer rim rising portion; 5*a*: annular flange; 5*b*: rim well rising portion precursor; 6: rim well; 7: outer rim outer shell portion; 8: annular hollow portion; 9: spoke; 10: spoke hollow portion; 12: bead seat precursor; 17, 18: flange; 21: light alloy automotive wheel; 22: spoke portion; 23: outer rim flange; 25: bead seat portion; 25': patch; 26: slope portion; 28: rim well portion; 30: annular flange; 31: hollow portion; 32: annular hollow portion; 35: annular flange.

The invention claimed is:

1. A method for manufacturing a light alloy automotive wheel having an outer rim portion, an inner rim portion and a center disc portion, comprising: forming a rim well rising portion that rises radially outwards from a rim well; providing an excess thickness on one or more of an outside diameter of a rim flange and an outer side of the rim flange; separating a portion of an outer rim which has the excess thickness and extends from a hump to a bead seat from part of the rim flange; and causing the portion of the outer rim to fall inwards of a wheel width in a sloping fashion so as to be joined to a top or side of the rim well rising portion, whereby an annular hollow portion is formed in and radially inwards of a bead seat portion.

2. A light alloy automotive wheel manufacturing method as set forth in claim 1, characterized in that the portion extending from the hump to the bead seat and the rising portion of the rim well are joined together by welding.

3. A method for manufacturing a light alloy automotive wheel having an outer rim portion, an inner rim portion and a center disc portion, comprising: forming a rim well rising portion that rises radially outwards from a rim well; forming a hollow portion in a spoke of the center disc portion so that the hollow portion in the spoke and an annular hollow portion are made to communicate with each other; separating a portion of an outer rim which extends from a hump to a bead seat from part of a rim flange; and causing the portion of the outer rim to fall inwards of a wheel width in a sloping fashion so as to be joined to a top or side of the rim well rising portion, whereby the annular hollow portion is formed in and radially inwards of a bead seat portion.

4. A light alloy automotive wheel manufacturing method as set forth in claim 3, characterized in that the portion extending from the hump to the bead seat and the rising portion of the rim well are joined together by welding.

* * * * *